US012659052B2

(12) United States Patent
Takla et al.

(10) Patent No.: US 12,659,052 B2
(45) Date of Patent: Jun. 16, 2026

(54) SYSTEMS AND METHODS FOR TESTING RADIO ACCESS NETWORK COMPONENTS USING FIELD RADIO FREQUENCY INPUT

(71) Applicant: Verizon Patent and Licensing Inc., Basking Ridge, NJ (US)

(72) Inventors: Mourad B. Takla, Hillsborough, NJ (US); Pertti Alapuranen, Deltona, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 366 days.

(21) Appl. No.: 18/456,795

(22) Filed: Aug. 28, 2023

(65) Prior Publication Data

US 2025/0080244 A1    Mar. 6, 2025

(51) Int. Cl.
*H04B 17/00* (2015.01)

(52) U.S. Cl.
CPC ................................. *H04B 17/0087* (2013.01)

(58) Field of Classification Search
CPC ............. H04B 17/0087; H04B 17/253; H04B 17/254; H04B 17/27; H04B 17/294; H04B 17/296; H04B 17/336; H04B 17/3912
See application file for complete search history.

(56) References Cited

U.S. PATENT DOCUMENTS

2019/0123882 A1*    4/2019    Chiang .................. H04L 5/0064
2022/0060915 A1*    2/2022    Takla ..................... H04W 72/21

* cited by examiner

*Primary Examiner* — Tuan Pham

(57)    ABSTRACT

In some implementations, a network simulator module that is associated with at least one of a radio access network (RAN) device or a user equipment (UE) may receive real-time radio frequency (RF) data. The real-time RF data may be associated with emulated real-time channel conditions corresponding to a simulated location of the at least one of the RAN device or the UE, and the at least one of the RAN device or the UE may be a physical device that is located at and/or in communication with the network simulator module. The network simulator module may receive measurement data associated with signal measurements associated with the at least one of the RAN device or the UE based on the real-time RF data. The network simulator module may determine a performance of the at least one of the RAN device or the UE based on the measurement data.

20 Claims, 8 Drawing Sheets

100

101

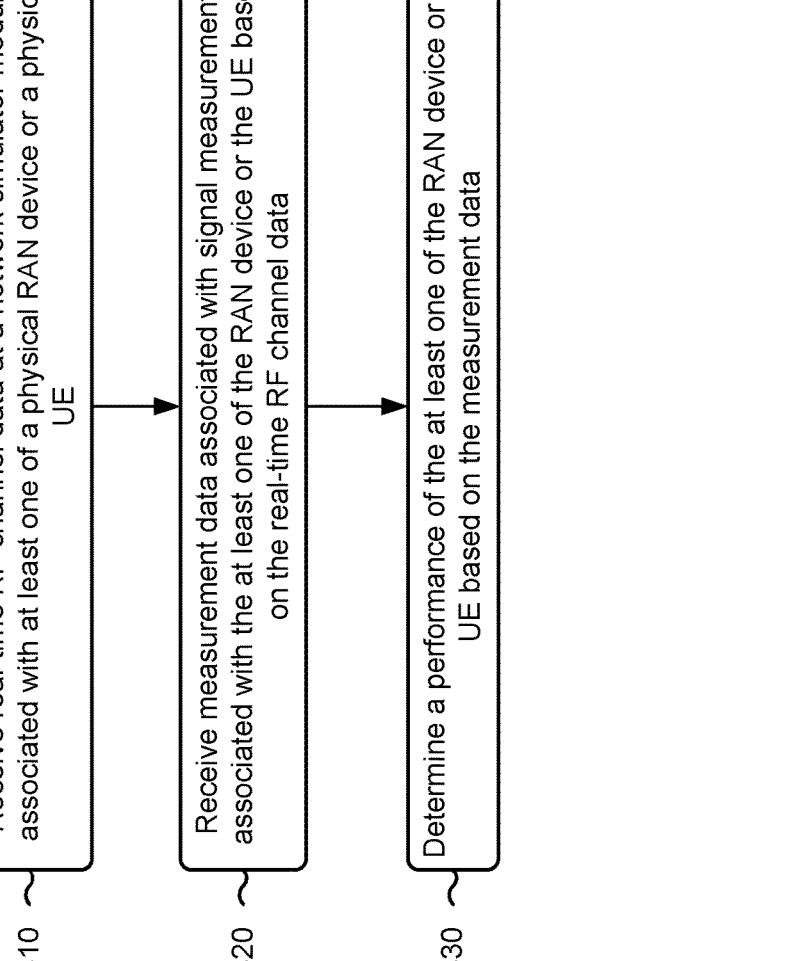

400

410  Receive real-time RF channel data at a network simulator module associated with at least one of a physical RAN device or a physical UE 420  Receive measurement data associated with signal measurements associated with the at least one of the RAN device or the UE based on the real-time RF channel data 430  Determine a performance of the at least one of the RAN device or the UE based on the measurement data

FIG. 4

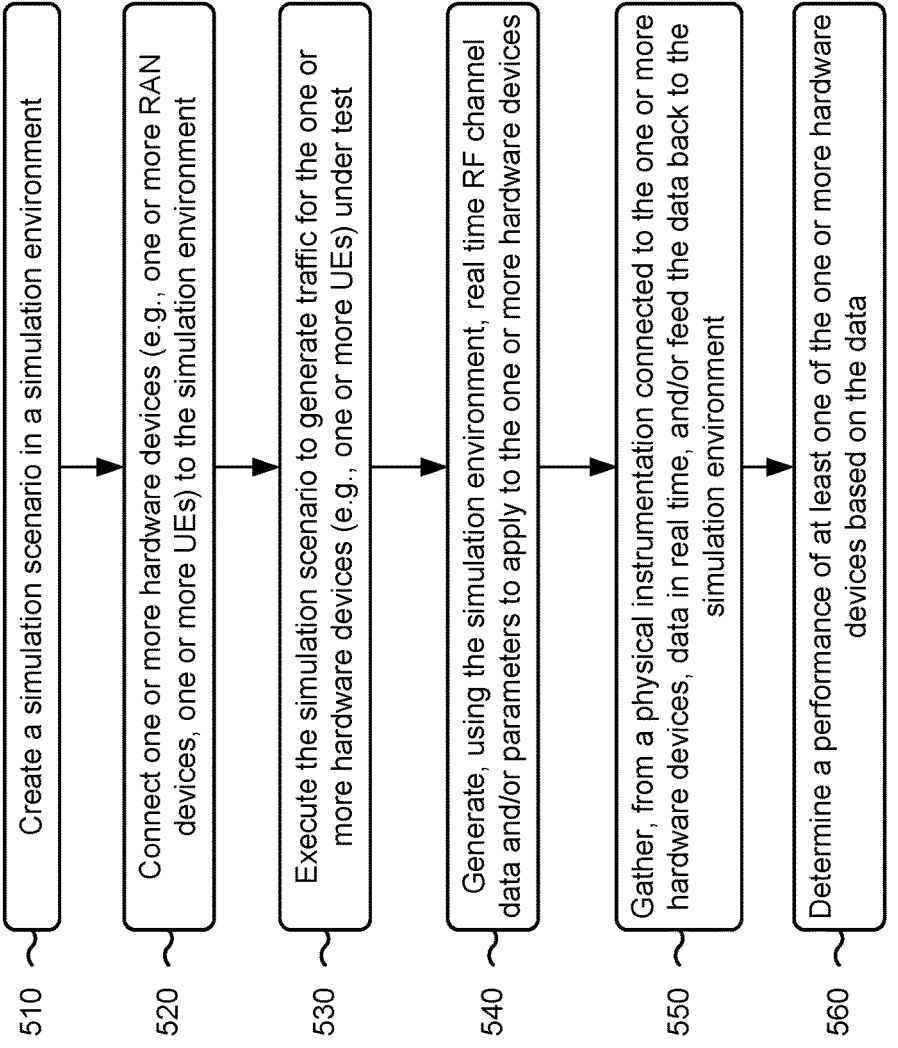

500

510 — Create a simulation scenario in a simulation environment

520 — Connect one or more hardware devices (e.g., one or more RAN devices, one or more UEs) to the simulation environment 530 — Execute the simulation scenario to generate traffic for the one or more hardware devices (e.g., one or more UEs) under test 540 — Generate, using the simulation environment, real time RF channel data and/or parameters to apply to the one or more hardware devices 550 — Gather, from a physical instrumentation connected to the one or more hardware devices, data in real time, and/or feed the data back to the simulation environment 560 — Determine a performance of at least one of the one or more hardware devices based on the data

FIG. 5

SYSTEMS AND METHODS FOR TESTING RADIO ACCESS NETWORK COMPONENTS USING FIELD RADIO FREQUENCY INPUT

BACKGROUND

A wireless telecommunication network may provide various telecommunication services such as telephony, video, data, messaging, and broadcasts. The wireless telecommunication network may include a number of network nodes (e.g., a Node B, a g Node B (gNB), an e Node B (eNB), an access point (AP), a radio head, a transmit receive point (TRP), a New Radio (NR) base station (BS), a Fifth Generation (5G) Node B, and/or the like) that can support communication for a number of user equipments (UEs). A UE may communicate with a network node via a downlink (a communication link from the network node to the UE) and an uplink (a communication link from the UE to the network node).

BRIEF DESCRIPTION OF THE DRAWINGS

FIG. 4 is a flowchart of an example process associated with testing RAN components using field RF input.

FIG. 5 is a flowchart of another example process associated with testing RAN components using field RF input.

DETAILED DESCRIPTION OF EXAMPLE EMBODIMENTS

Figure 1A:
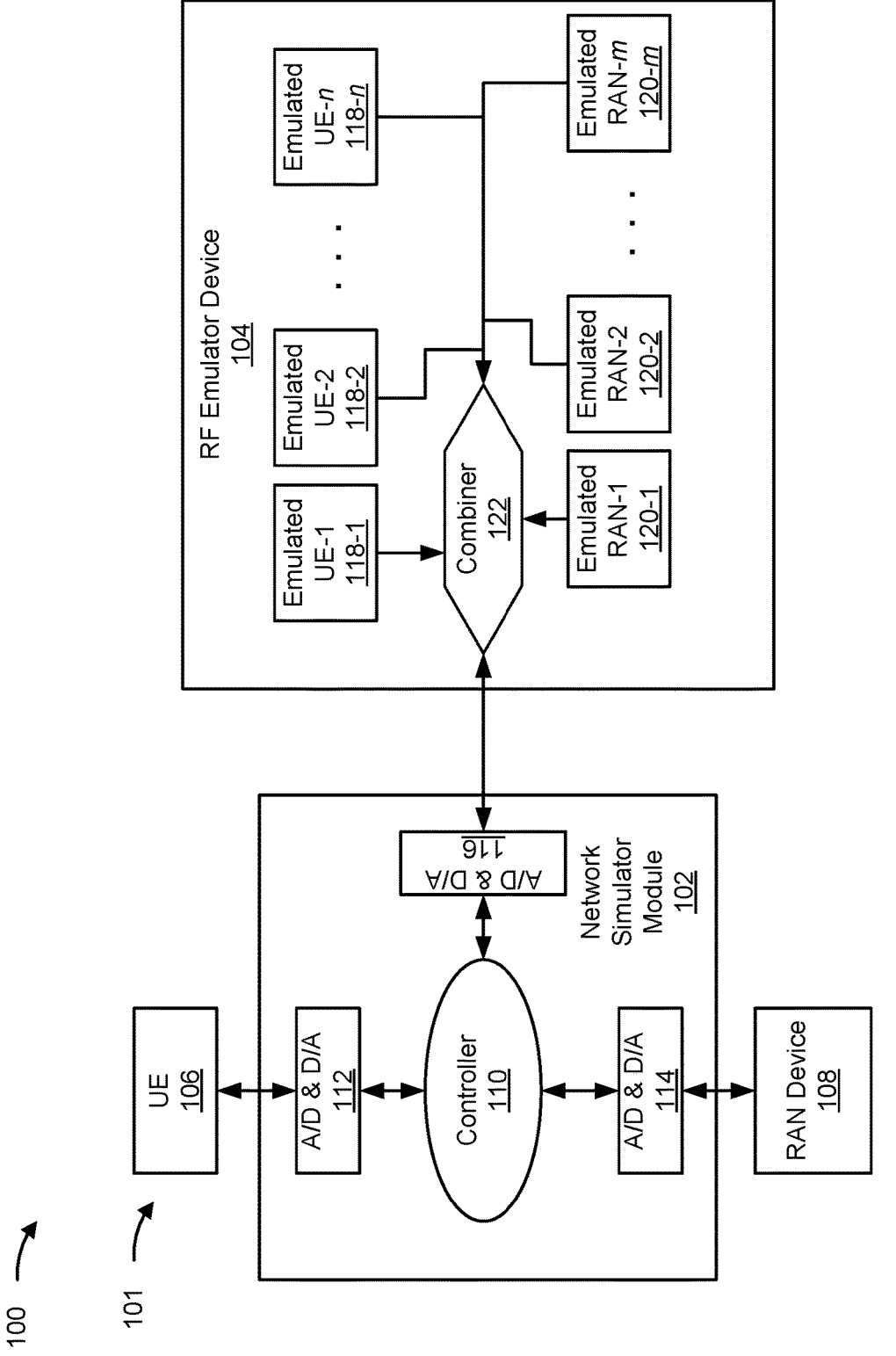
FIGS. 1A-1D are diagrams of an example associated with testing radio access network (RAN) components using field radio frequency (RF) input.

The following detailed description of example implementations refers to the accompanying drawings. The same reference numbers in different drawings may identify the same or similar elements.

In some instances, an operator may determine to deploy a new wireless communication device (e.g., a RAN device, a UE, or a similar device) in a wireless telecommunication network and/or to modify a wireless telecommunication network. For example, an operator may determine that a new network node (e.g., a new base station) is to be installed to enable the wireless telecommunication network to accommodate additional UEs, that the wireless telecommunication network is to be reconfigured to increase a quality of service associated with the wireless telecommunication network, that a site within the wireless telecommunication is to be decommissioned, that a new model of a RAN device and/or a new model of a UE is to be deployed in the wireless telecommunication network, and/or the like.

Prior to deploying a new wireless communication device in the wireless telecommunication network and/or prior to modifying the wireless telecommunication network, the operator may run a simulation to test the effect of the deployment and/or modification on the wireless telecommunication network. For example, the operator may run a simulation to determine an increase in a quantity of UEs that can be accommodated by the wireless telecommunication network that may result from installing the new network node, whether a change to the configuration of the wireless telecommunication network will improve the quality of service associated with the wireless telecommunication network, whether a new model of a RAN device and/or a UE will outperform certain other models, and/or the like.

To run the simulation, the user may utilize individual hardware components to simulate the devices (e.g., the UEs, the RAN devices, the network nodes, and/or the like) included in the wireless telecommunications network. The hardware components may communicate via wireless communication. To prevent unwanted signals from interfering with the simulation, the hardware components may be placed in a dedicated, shielded room. The use of a dedicated, shielded room may increase a complexity and/or a cost with running the simulation. Further, the number of components that can be included in the simulation may be limited by a size of the room. Moreover, performing wireless communication in a shielded room may result in unrealistic operating conditions and/or poor simulation of actual conditions that a device may experience in the field.

Alternatively, the user may utilize a software-based system to perform the simulation. The software-based system may utilize software components to simulate the devices included in the wireless telecommunication network. The use of the software components may eliminate the need to perform the simulation in a dedicated, shielded room. However, the time required to execute the simulation may be greatly increased relative to utilizing individual hardware components to simulate the devices. Moreover, simulated network elements (e.g., UEs, RAN devices, network nodes, and/or the like) may not perform in a similar manner to physical devices in the field due to absence of casings and other components that may affect a performance of the network elements. As a result, the simulations may return poor results, resulting in a less than optimal network configuration and thus inefficient usage of network resources.

Some implementations described herein enable simulation of a wireless telecommunication network and/or evaluation of RAN products using both physical and virtual components, thereby introducing field RF channel effects, such as a channel model, interference, fast fading, and/or other effects, to physical RAN devices. This may result in improved evaluation of RAN products by introducing more complex RF scenarios in a test environment before deployment of the RAN products into the field. In some implementations, a physical layer emulator or a similar RF emulator device (sometimes referred to as a network emulator device) may be in communication with a network simulator module or a similar network simulation device, such as for a purpose of providing real-time RF data to the network simulator module. The network simulator module may be in communication with one or more physical devices (e.g., a RAN device, such as a distributed unit (DU) and/or a radio unit (RU), a UE, and/or a similar wireless communication device), and/or may be configured to introduce inter-channel interference, fast fading, and/or other RF channel effects to the physical device under test based on the RF channel data received from the physical layer emulator. As a result, the network simulator module may enable a unique environment that utilizes a virtual environment to test physical elements (e.g., RAN devices, UEs, and/or the like), resulting in more complex simulations and enabling testing of a variety of situations for the physical elements. As a result, network devices may be optimized prior to deployment in the field, resulting in more efficient usage of network resources and thus increased bandwidth, decreased latency, and improved wireless communications.

FIGS. 1A-1D are diagrams of an example 100 associated with testing RAN components using field RF input. As shown in FIGS. 1A-1D, example 100 includes a network simulator module 102, an RF emulator device 104, a UE 106, and/or a RAN device 108 (e.g., a base station, a network node, a DU, an RU, and/or a similar network device).

As shown in FIG. 1A, the network simulator module 102 may include, and/or may be in communication with, the UE 106, the RAN device 108, and/or the RF emulator device 104. In some implementations, the network simulator module 102 may include or be in communication with multiple UEs and/or multiple RAN devices, which is described in more detail below in connection with FIGS. 1B-1D. The UE 106, the RAN device 108, and/or the RF emulator device 104 may be in communication with and/or operatively coupled to the network simulator module 102 using a wireless connection and/or a wired connection. In that regard, the UE 106, the RAN device 108, and/or the RF emulator device 104 may be configured to receive signals from, and transmit signals to, the network simulator module 102. In some implementations, the UE 106 and/or the RAN device 108 may be a physical device, and the RF emulator device 104 may be a device capable of simulating and/or emulating real-time RF conditions for a simulated location (e.g., a geographic location) of the one or more physical devices. In this way, uplink and downlink communications between one or more physical devices may be simulated for a given location, which may more accurately simulate field conditions as compared to utilizing only virtual devices (e.g., emulated UEs and/or RAN devices).

In some implementations, the network simulator module 102 may include a controller 110 that is configured to process one or more signals received from the UE 106, the RAN device 108, and/or the RF emulator device 104. In some implementations, the controller 110 may be configured to process signals in the analog domain and/or the digital domain. In that regard, the network simulator module 102 may include one or more analog/digital (A/D) converters and/or one or more digital/analog (D/A) converters configured to convert signals from the analog domain to the digital domain and/or configured to convert signals from the digital domain to the analog domain. For example, in the example depicted in FIG. 1A, the network simulator module 102 may include a first A/D and/or D/A converter 112 configured to process signals received from and/or transmitted to the UE 106, a second A/D and/or D/A converter 114 configured to process signals received from and/or transmitted to the RAN device 108, and/or a third A/D and/or D/A converter 116 configured to process signals received from and/or transmitted to the RF emulator device 104. Details regarding A/D and/or D/A conversion of signals are described in more detail below in connection with FIGS. 1B-1D.

The RF emulator device 104 may be a device capable of simulating and/or emulating real-time RF (e.g., physical layer) channel conditions (e.g., real-time interference conditions, real-time UE traffic conditions, real-time fast fading conditions, and/or the like) for a location being tested (e.g., a geographic location being simulated for the test devices). In that way, the RF emulator device 104 may be capable of emulating one or more network elements operating near a simulated location, such as one or more emulated UEs 118 (shown as emulated UE-1 118-1 through emulated UE-n 118-n in FIG. 1A) and/or one or more emulated RAN devices 120 (shown as emulated RAN-1 120-1 through emulated RAN-m 120-m in FIG. 1A), among other network elements. The emulated network elements may correspond to actual elements deployed in the field, such as RAN devices neighboring a location being tested, UEs operating near a location being tested and/or within a cell being tested, or the like. The RF emulator device 104 may be associated with additional components and/or datasets associated with field RF conditions. The RF emulator device may further include a combiner 122 or similar component configured to aggregate data from the emulated UEs 118, emulated RAN devices 120, and/or other datasets in order to generate real-time RF data associated with RF conditions at a given location.

In this way, the RF emulator device 104 may be capable of simulating and/or emulating real-time RF conditions for a certain location under test. More particularly, in some implementations, the RF emulator device 104 may utilize field RF to build a channel model, a variety of RF models, different fading tables, and/or the like, in order to emulate RF channel conditions for a given location. For example, the RF emulator device 104 may generate per transmission time interval (TTI) uplink and/or downlink interference for various cells and/or UEs, may apply fast fading effects in real-time for the uplink and/or downlink, and/or may emulate other real-time channel conditions in the uplink and/or downlink, which is described in more detail below in connection with FIGS. 1B-1D. The signal leaving the combiner 122 or similar component, which is sometimes referred to herein as real-time RF data, may be provided to network simulator module 102, such as for a purpose of combining interference, fast fading, and other channel effects to communications between the UE 106 and the RAN device 108 (e.g., one or more physical devices under test), providing a more accurate telecommunication network simulation. In some implementations, combining interference, fast fading, and other channel effects to communications between physical devices under test (e.g., the UE 106 and the RAN device 108) may enable introduction of complex field-like scenarios that are not achievable by other standard methods of testing communication devices, such as the use of UE simulators and/or direct testing of a DU using a number of UEs in a shielded room.

In some implementations, the RF emulator device 104 may be configured to control a real UE 106 under test (e.g., a physical UE 106 that is being tested by the network simulation system 101) as if the UE 106 was a simulated UE, while keeping the real UE 106 connected to the RAN device 108. Additionally, or alternatively, the RF emulator device 104 may be capable of aggregating interference of all the cells near the simulated location of the RAN device 108 and/or the UE 106 (sometimes referred to as aggregated interference) and thus provide the aggregated interference value to the network simulator module 102 (e.g., via the real-time RF data). In this regard, the network simulator module 102 may be configured to receive the aggregated interference data and/or the RF of any emulated UEs that are connected to the physical cell (e.g., the physical RAN device 108 under test).

In that regard, the controller 110, the A/D and/or D/A converters 112, 114, 116, and/or similar components of the network simulator module 102 shown in FIG. 1A may be associated with hardware components that are capable of applying a channel model, interference, fast fading effects, and/or similar channel conditions to an uplink and/or downlink between the UE 106 and the RAN device 108. Moreover, because the UE 106 and/or the RAN device 108 may be physical devices in communication with the network simulator module 102, the UE 106 and/or the RAN device 108 may not be aware that the UE 106 and/or the RAN device 108 is interacting in a simulated environment. More particularly, the UE 106 and/or the RAN device 108 may act as if deployed in the field, providing an optimized test environment and thus optimized telecommunication network configurations.

In some implementations, such as when a physical UE 106 is under test via the network simulation system 101, the RAN device 108 may be an emulated device (e.g., a RAN physical layer stack associated with the network simulator module 102 that is separate from a physical RAN device casing or the like). In some other implementations, such as when a physical RAN device 108 is under test, the UE 106 may be an emulated device (e.g., a UE physical layer stack associated with the network simulator module 102 that is separate from a physical UE casing or the like). Additionally, or alternatively, in implementations in which a physical RAN device 108 is associated with the network simulator module 102, one or more components of the RAN device 108 may be physical components while one or more other components of the RAN device 108 may be emulated components. For example, in some implementations, the RAN device 108 may be associated with a physical DU (sometimes referred to herein as a high physical (PHY) layer component) and a physical RU (sometimes referred to herein as a low PHY layer component), while, in some other implementations, the RAN device 108 may be associated with a physical DU (e.g., a physical high PHY layer component) and an emulated RU (e.g., a RAN PHY layer stack or the like).

In this regard, in implementations in which the network simulation system 101 utilizes a real UE 106 and a real RAN device 108, the network simulator module 102 may be configured to generate signals at a proper RF band corresponding to the UE 106 and/or the RAN device 108. Additionally, or alternatively, in implementations in which the network simulator module 102 utilizes a real UE 106, a real DU component (e.g., real high PHY layer component), and a RAN physical layer stack (e.g., an emulated low PHY layer component), the network simulator module 102 may be configured to generate signals at basebands. In some implementations, using a real UE 106 and/or a real RAN device 108 (e.g., a real DU and a real RU) may result in a more accurate representation of real-life scenarios, but may require operation at the RF band and baseband, resulting in more complex hardware components. On the other hand, using a real UE 106 in connection with a RAN physical layer stack and a high PHY layer component may result in more flexibility in the network simulation system 101 and/or fewer hardware requirements, but may limit the impact of RF noise because the network simulator module 102 may be operating in a single frequency range, which may lead to less accurate test conditions.

In some aspects, the RF emulator device 104 may be configured to generate information associated with the real-time RF data in order to enable the network simulator module 102 to manipulate the RF at the network simulator module 102. Accordingly, moving a simulated location of the UE 106 within the network simulator module 102 and/or the RF emulator device 104 may result in changed applied channel conditions at the UE 106. In this way, a physical RAN device 108 and/or a physical UE 106 may be introduced into a virtual environment to experience field RF and/or permit testing of UE movement and interference from neighboring virtual cells. This may enable flexibility in the network simulation system 101 to test real hardware elements using the power of a virtual environment, resulting in a more realistic test environment that is capable of introducing inter-cell interference from large neighbor set, providing fast fading per UE, and/or testing RAN devices under different channel conditions.

In some aspects, the controller 110 of the network simulator module 102 may be configured to receive the real-time RF data from the RF emulator device 104, apply the real-time RF data with uplink and/or downlink channels between the UE 106 and the RAN device 108, and/or monitor a performance of the UE 106 and/or the RAN device 108 associated with the real-time RF channel conditions. For example, in some implementations, the network simulator module 102 may receive, from the RF emulator device 104, the RF channel data, which may include aggregated interference data and/or other channel effects associated with the emulated UEs 118, the emulated RAN devices 120, and/or other network elements operating near a simulated location of the device under test (e.g., the UE 106 and/or the RAN device 108). Put another way, the real-time RF data may be associated with emulated real-time channel conditions corresponding to a simulated location of the at least one of the RAN device 108 or the UE 106. In that regard, the real-time RF data may be associated with an RF interference corresponding to the simulated location of the at least one of the RAN device 108 or the UE 106, fast fading effects corresponding to the simulated location of the at least one of the RAN device 108 or the UE 106, UE traffic (e.g., associated with the emulated UEs 118) corresponding to the simulated location of the at least one of the RAN device 108 or the UE 106, a simulated movement of the UE 106, or similar real-time RF data. The network simulator module 102 may perform certain signal measurements associated with the RAN device 108 and/or the UE 106, and/or the network simulator module 102 may receive measurement data associated with signal measurements associated with the RAN device 108 or the UE 106, based on the real-time RF data. Based on the measurement data, the network simulator module 102 may determine a performance of the RAN device 108 and/or the UE 106, which may be indicative of a real-world performance of the RAN device 108 and/or the UE 106.

In some implementations, the network simulator module 102 may be configured to change one or more network parameters and/or channel conditions and thus monitor a change in performance of the UE 106 and/or the RAN device 108. For example, the network simulator module 102 may be configured to test various channel conditions to determine a performance of the UE 106 and/or the RAN device 108 in the varying conditions. In this regard, in some implementations, the network simulator module 102 may receive, from the RF emulator device 104, updated real-time RF data, may receive updated measurement data associated with updated signal measurements associated with the RAN device 108 and/or the UE 106 based on the updated real-time RF data, and/or may determine an updated performance of the RAN device 108 and/or the UE 106 based on the updated measurement data.

In some implementations, the network simulation system 101 may be configured to test one or both of the UE 106 (or else multiple UEs 106) and the RAN device 108 in connection with uplink transmissions (e.g., signals transmitted from the UE 106 to the RAN device 108), while, in some other implementations, the network simulation system 101 may be configured to test one or both of the UE 106 (or else multiple UEs 106) and the RAN device 108 in connection with downlink transmissions (e.g., signals transmitted from the RAN device 108 to the UE 106). For example, FIG. 1B shows a diagram illustrating an example of the network simulation system 101 testing downlink transmissions from the RAN device 108 to multiple (e.g., N) UEs 106, FIG. 1C shows a diagram illustrating an example of the network simulation system 101 testing uplink transmissions from the multiple (e.g., N) UEs 106 to the RAN device 108, and FIG. 1D shows a diagram illustrating another example of the network simulation system 101 testing downlink transmissions from the RAN device 108 to multiple (e.g., N) UEs 106 and/or testing uplink transmissions from the multiple (e.g., N) UEs 106 to the RAN device 108.

Figure 1B:
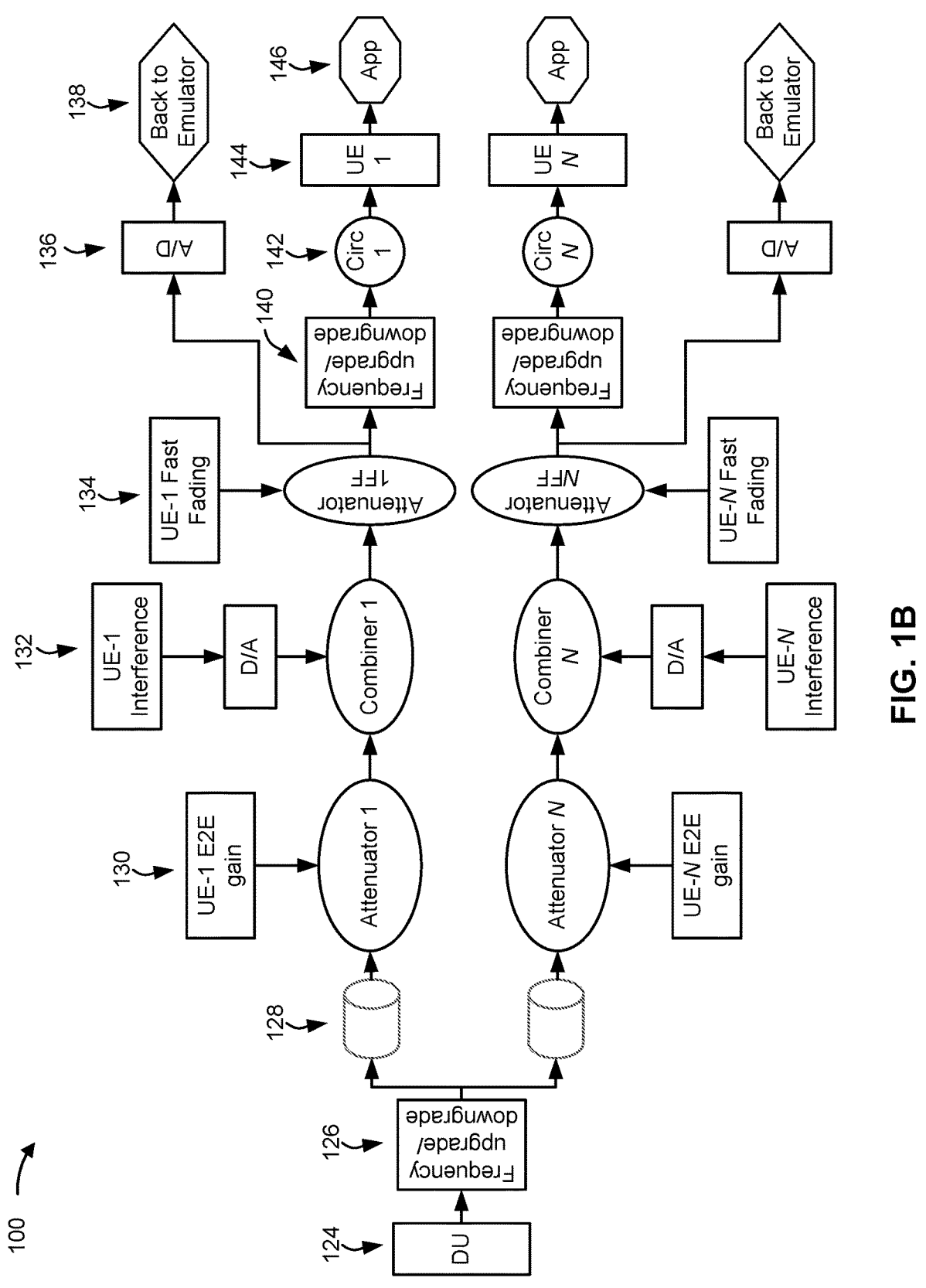
Figure 1C:
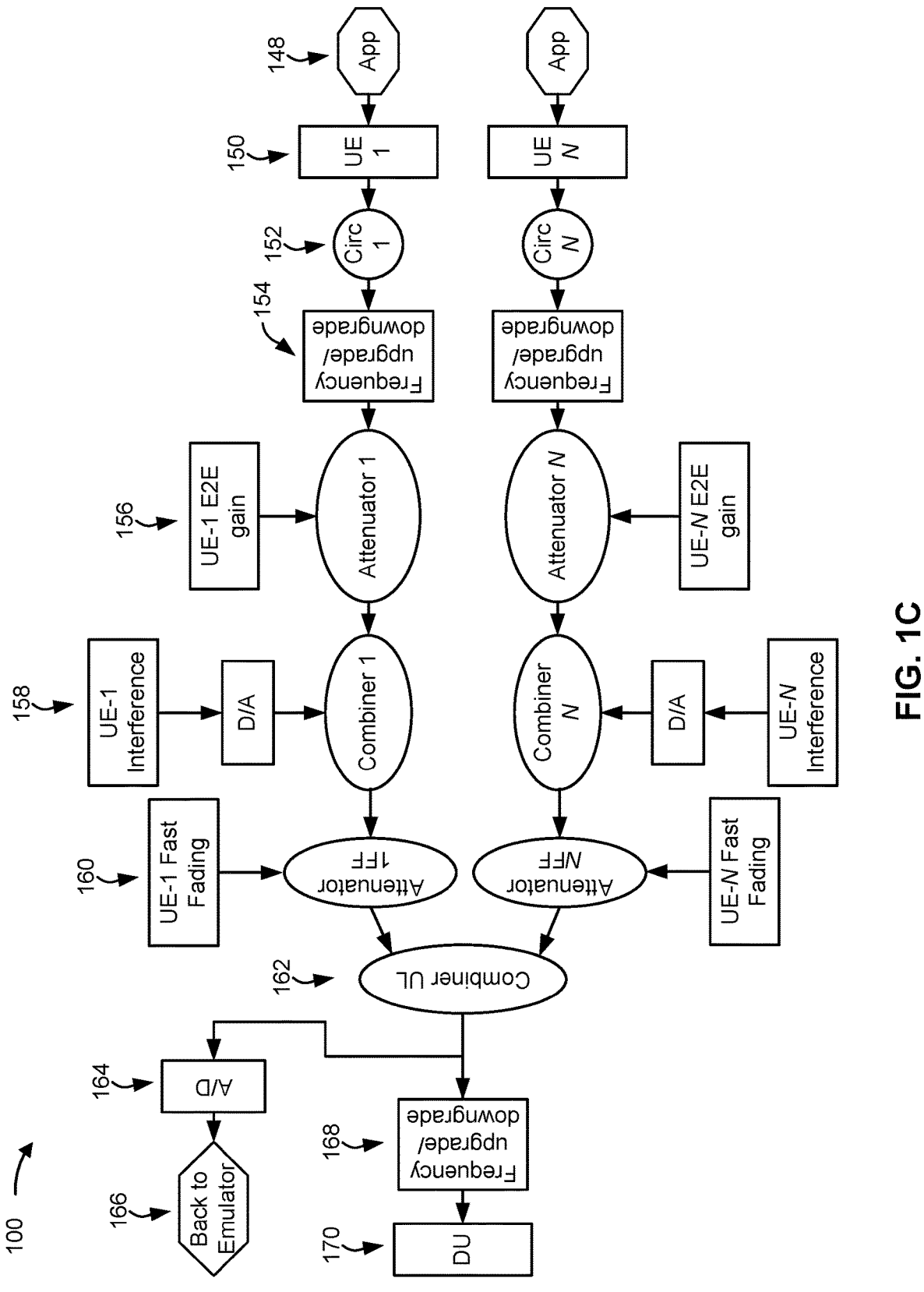
Figure 1D:
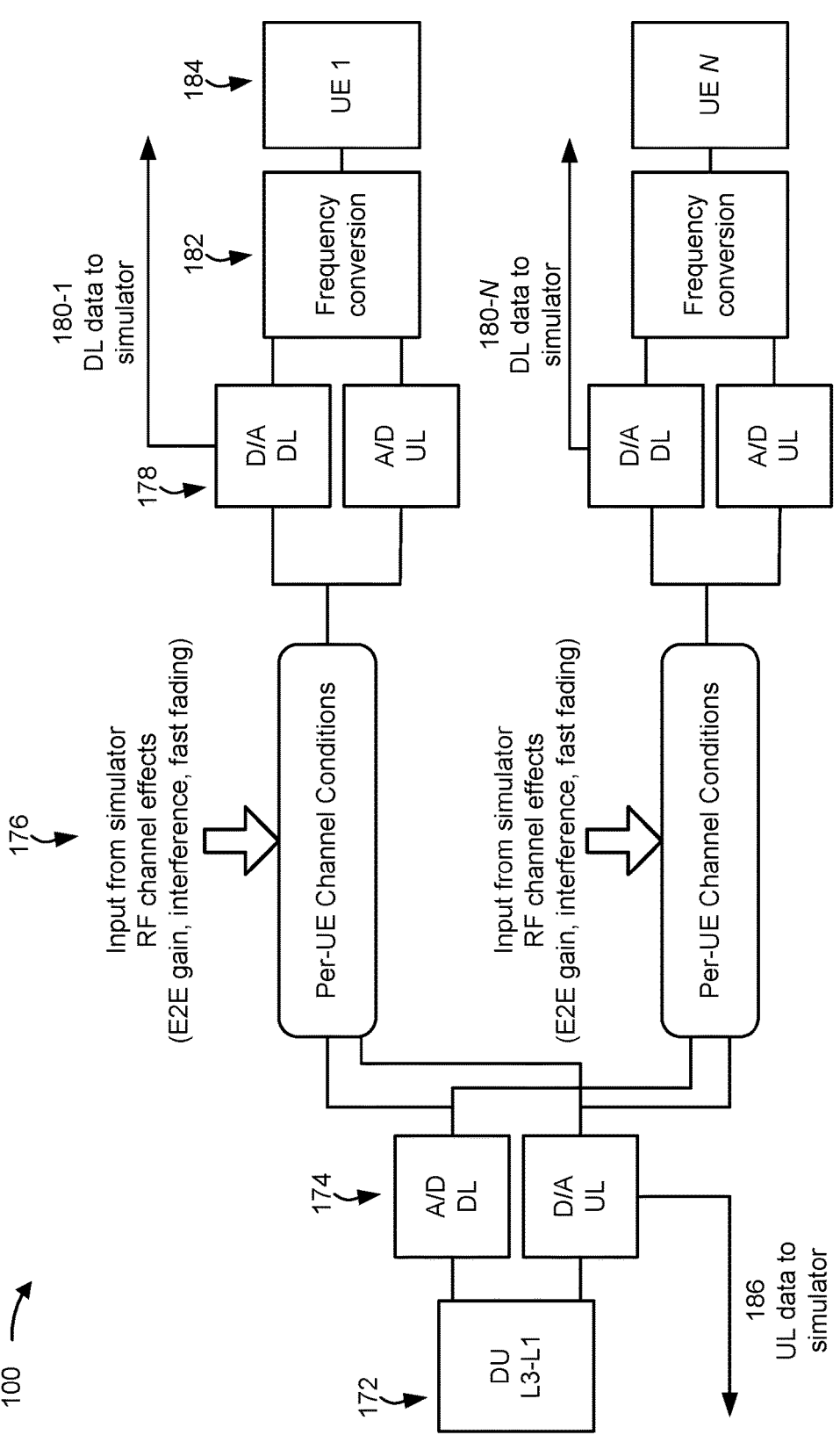

As shown in FIG. 1B, and as indicated by reference number 124, a DU associated with the RAN device 108 and/or a similar high PHY layer component may generate a downlink signal. As indicated by reference number 126, the downlink signal may be passed through a frequency upgrade/downgrade component, such as for a purpose of upgrading or downgrading the downlink signal to a baseband (e.g., the downlink signal may be normalized to a baseband) in order to simplify hardware components associated with the network simulator module 102 and/or other components of the network simulation system 101. As indicated by reference number 128, the downlink signal may be split into multiple (e.g., N) chains, one corresponding to each of the N UEs 106. In this way, channel interference and other RF effects (e.g., provided by the RF emulator device 104) may be applied uniquely per UE 106. In some implementations, in addition to splitting the normalized signal into N transmission chains associated with the N UEs 106 under test, the normalized signal may be amplified, such as for a purpose of delivering a signal to each UE 106 that satisfies a signal strength threshold to each UE 106.

In some implementations, the RF emulator device 104 may define a simulated location of each UE 106 in a simulated environment. In such implementations, and as indicated by reference number 130, a per-UE 106 end-to-end (E2E) gain may be applied to the corresponding transmission chains using one or more attenuators (e.g., using attenuator 1 through attenuator N in the example depicted in FIG. 1B). In that regard, in some implementations, the controller 110 of the network simulator module 102 may be associated with one or more attenuator components (e.g., attenuator 1 through attenuator N). Additionally, or alternatively, the RF emulator device 104 may compute an accumulated interference per UE 106 (e.g., based on the simulated location of the corresponding UE 106 in the simulated environment), convert that signal to analog, and add the converted signal to the signal out of the attenuator in each transmission chain, as indicated by reference number 132. In that regard, in some implementations, the controller 110 of the network simulator module 102 may be associated with one or more combiner components (e.g., shown as combiner 1 through combiner N in FIG. 1B).

In some implementations, the RF emulator device 104 may determine a per-UE fast fading value, which may be based on a simulated location of a corresponding UE 106, a simulated speed of a corresponding UE 106, and/or similar factors. Accordingly, as indicated by reference number 134, the network simulation system 101 may apply the corresponding fast fading (FF) effects to each transmission chain, such as via one or more attenuator components (e.g., shown as attenuator 1FF through attenuator NFF in FIG. 1B). In that regard, in some implementations, the controller 110 of the network simulator module 102 may be associated with one or more fast fading attenuator components (e.g., attenuator 1FF through attenuator NFF).

As indicated by reference numbers 136 and 138, the output of the last-stage attenuator (e.g., the fast fading attenuator component) may be fed back to the RF emulator device 104, such as for a purpose of display to a user of the network simulation system 101 and/or analysis of the interference and/or fast fading effects on the respective UEs 106, to reflect the effect the actual UEs (e.g., UE 1 through UE N) on a simulation environment (e.g., a simulation environment generated by the RF emulator device 104), or the like. More particularly, as indicated by reference number 136, the signal may be converted from the analog domain to the digital domain (e.g., via the A/D and/or D/A converter 116), and then, as indicated by reference number 138, the signal may be transmitted to the RF emulator device 104. Additionally, or alternatively, as indicated by reference number 140, the signal of each transmission chain may be upgraded or downgraded, such as for a purpose of converting the signal from a baseband to a corresponding frequency band associated with each respective UE 106. Moreover, as indicated by reference number 142, each signal may be fed to a corresponding circulator component (shown in FIG. 1B as circulator 1 through circulator N). In that regard, in some implementations, the controller 110 of the network simulator module 102 may be associated with one or more circulator components (e.g., circulator 1 through circulator N). As indicated by reference numbers 144 and 146, the per-UE signal may then be fed to a corresponding UE 106 under test (shown in FIG. 1B as UE 1 through UE N) and/or an application (shown in FIG. 1B as "app") at each UE 106 under test.

As shown in FIG. 1C, in the uplink, the operations described above in connection with FIG. 1B may generally be performed in reverse. More particularly, as indicated by reference numbers 148 and 150, each UE 106, of the N UEs 106 under test (or else an application at each UE 106, of the N UEs 106, under test), may generate an uplink signal. As indicated by reference number 152, each uplink signal may be fed through a corresponding circulator (e.g., circulator 1 through circulator N). As indicated by reference number 154, the uplink signals leaving the circulators may undergo frequency upgrading and/or downgrading, such as for a purpose of converting the signal to the baseband in order to simplify the hardware components associated with the network simulator module 102. As indicated by reference number 156, a corresponding E2E gain may be applied to each transmission chain (e.g., via attenuator 1 through attenuator N), which may correspond to an E2E gain associated with a respective simulated location of the UE 106 in the simulated environment, in a similar manner as described above in connection with reference number 130.

As indicated by reference number 158, the per-UE interference in the simulation environment may be applied (via an A/D converter) to each transmission chain (e.g., using combiner 1 through combiner N), in a similar manner as described above in connection with reference number 132. As indicated by reference number 160, the per-UE fast fading in the simulation environment may be applied to each transmission chain (e.g., using attenuator 1FF through attenuator NFF), in a similar manner as described above in connection with reference number 134. As indicated by reference number 162, the separate transmission chains may be combined (e.g., via a combiner uplink (UL) component) into a single uplink signal. In that regard, in some implementations, the controller 110 of the network simulator module 102 may be associated with a combiner UL component. As indicated by reference numbers 164 and 166, the combined signal may be fed back to the RF emulator device 104, such as for a purpose of display to a user of the network simulation system 101 and/or analysis of the interference and/or fast fading effects on the uplink signal. More particularly, as indicated by reference number 164, the signal may be converted from the analog domain to the digital domain (e.g., via the A/D and/or D/A converter 116), and then, as indicated by reference number 166, the signal may be transmitted to the RF emulator device 104.

Additionally, or alternatively, as indicated by reference number 168, the combined signal may be upgraded or downgraded, such as for a purpose of converting the signal from a baseband to a frequency band associated with the RAN device 108. Moreover, as indicated by reference number 170, the uplink signal may then be fed to the RAN device 108 under test (e.g., transmitted to an RU of the DU under test). In this way, the network simulation system 101 may enable optimized testing of real and/or physical network elements (e.g., physical UEs 106 and/or RAN devices 108) using real-time RF data, resulting in more robust testing environments, optimized network and device configuration parameters, and overall, more efficient network communications.

FIG. 1D shows another example associated with the network simulation system 101 testing downlink and/or uplink transmissions associated with the RAN device 108 and multiple (e.g., N) UEs 106, according to some other implementations. First, in the downlink, and as indicated by reference number 172, a DU (e.g., layers 1, 2, and 3 of a DU) associated with the RAN device 108 and/or a similar high PHY layer component may generate a downlink signal. As indicated by reference number 174, the downlink signal may be passed through an A/D converter to convert the analog signal generated by the DU to the digital domain. The downlink signal may be split into multiple (e.g., N) chains, one corresponding to each of the N UEs 106. In this way, channel interference and other RF effects (e.g., provided by the RF emulator device 104) may be applied uniquely per UE 106.

More particularly, as indicated by reference number 176, per-UE channel conditions may be applied to each of the N chains, such by applying input (e.g., RF channel effects) from a simulator (e.g., the RF emulator device 104) to each UE 106. As described above in connection with FIGS. 1A-1C, in some implementations applying the per-UE channel conditions may include applying a per-UE E2E gain to each transmission chain, applying a per-UE accumulated interference to each transmission chain, applying a per-UE fast fading value to each transmission chain, or applying a similar per-UE channel condition to each transmission chain.

As indicated by reference number 178, each signal may be converted from the digital domain to the analog domain (e.g., via a D/A converter), and then, as indicated by reference number 180, the signals may be transmitted to a simulator (e.g., the RF emulator device 104). More particularly, as indicated by reference number 180-1, the downlink data associated with UE 1 may be transmitted to the simulator, and as indicated by reference number 180-N, the downlink data associated with UE N may be transmitted to the simulator. Additionally, or alternatively, as indicated by reference number 182, the signal of each transmission chain may be frequency converted (e.g., upgraded or downgraded), such as for a purpose of converting the signal from a baseband to a corresponding frequency band associated with each respective UE 106. Moreover, as indicated by reference number 184, the per-UE signal may then be fed to a corresponding UE 106 under test (shown in FIG. 1D as UE 1 through UE N).

In the uplink, the operations described above may generally be performed in reverse. More particularly, as indicated by reference number 184, each UE 106, of the N UEs 106 under test, may generate an uplink signal. As indicated by reference number 182, the uplink signals may undergo frequency conversion (e.g., upgrading and/or downgrading), such as for a purpose of converting the signal to the baseband. As indicated by reference number 178, the uplink signals may be passed through an A/D converter, such as for a purpose of converting the N uplink signals to the digital domain. As indicated by reference number 176, per-UE channels conditions (e.g., E2E gain, interference, fast fading, or the like) may then be applied to the N uplink chains. As indicated by reference number 174, the uplink signals, with the per-UE channel conditions applied thereto, undergo a D/A conversion, such as for a purpose of converting the signals to the analog domain.

In some implementations, as indicated by reference number 186, the uplink data may be fed back to a simulator (e.g., the RF emulator device 104), such as for a purpose of display to a user of the network simulation system 101 and/or analysis of the interference and/or fast fading effects on the uplink signal. Additionally, or alternatively, as indicated by reference number 172, the uplink signal may then be fed to the DU (e.g., the RAN device 108 under test). In this way, the network simulation system 101 may enable optimized testing of real and/or physical network elements (e.g., physical UEs 106 and/or RAN devices 108) using real-time RF data, resulting in more robust testing environments, optimized network and device configuration parameters, and overall, more efficient network communications.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
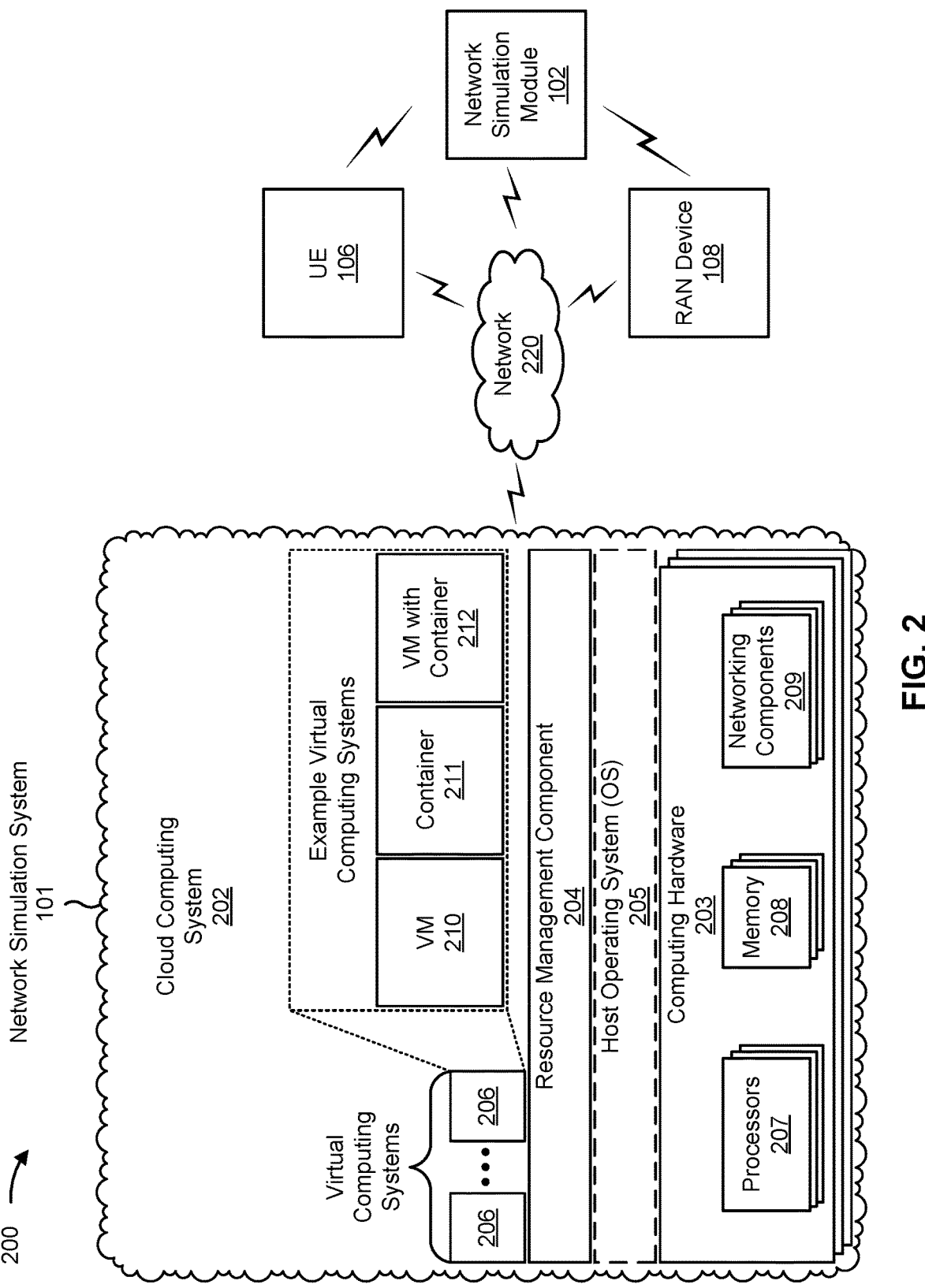
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the network simulation system 101, which may include one or more elements of and/or may execute within a cloud computing system 202. The cloud computing system 202 may include one or more elements 203-212, as described in more detail below. In some implementations, one or more of the elements 203-212 may correspond to, or may be associated with, the RF emulator device 104. As further shown in FIG. 2, environment 200 may include a network 220, the network simulator module 102, a UE 106, and/or RAN device 108. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the network simulation system 101 may include one or more elements 203-212 of the cloud computing system 202, may execute within the cloud computing system 202, and/or may be hosted within the cloud computing system 202, in some implementations, the network simulation system 101 may not be cloud-based (e.g., may be implemented outside of a cloud computing system) or may be partially cloud-based. For example, the network simulation system 101 may include one or more devices that are not part of the cloud computing system 202, such as device 300 of FIG. 3, which may include a standalone server or another type of computing device. The network simulation system 101 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The network simulator module 102 may include one or more components configured to perform one or more of the operations described above in connection with FIGS. 1A-1C. In some implementations, the network simulator module 102 may be configured to perform wireless telecommunication system simulations using both virtual and physical components, such as by using emulated real-time RF channel signals in connection with one or more physical UEs and/or physical RAN devices under test. In some implementations, the network simulator module 102 may include one or more of the components described above in connection with FIGS. 1A-1C, such as a controller (e.g., controller 110), one or more A/D and/or D/A converters (e.g., A/D and/or D/A converters 112, 114, 116), one or more attenuators (e.g., one or more analog attenuators), one or more combiners, one or more circulators, and/or one or more similar signal processing components.

The UE 106 may be a virtual device (e.g., an emulated UE) or a physical device, as described above in connection with FIGS. 1A-1C. In some implementations, the UE 106 may include one or more devices capable of receiving, generating, storing, processing, and/or providing information, such as information described herein. For example, the UE 106 may include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN device 108 may be a virtual device (e.g., an emulated DU and/or RU) or a physical device, as described above in connection with FIGS. 1A-1C. In some implementations, the RAN device 108 may support, for example, a cellular radio access technology (RAT). The RAN device 108 may include one or more base stations (e.g., base transceiver stations, radio base stations, node Bs, eNBs, gNBs, base station subsystems, cellular sites, cellular towers, access points, transmission reception points (TRPs), radio access nodes, macrocell base stations, microcell base stations, picocell base stations, femtocell base stations, or similar types of devices) and other network entities that can support wireless communication for the UE 106. The RAN device 108 may transfer traffic between the UE 106 (e.g., using a cellular RAT), one or more base stations (e.g., using a wireless interface or a backhaul interface, such as a wired backhaul interface), and/or a core network. The RAN device 108 may provide one or more cells that cover geographic areas.

In some implementations, the RAN device 108 may perform scheduling and/or resource management for a UE covered by the RAN device 108 (e.g., a UE covered by a cell provided by the RAN device 108). In some implementations, the RAN device 108 may be controlled or coordinated by a network controller, which may perform load balancing, network-level configuration, and/or other operations. The network controller may communicate with the RAN device 108 via a wireless or wireline backhaul. In some implementations, the RAN device 108 may include a network controller, a self-organizing network (SON) module or component, or a similar module or component. In other words, the RAN device 108 may perform network control, scheduling, and/or network management functions (e.g., for uplink, downlink, and/or sidelink communications of a UE covered by the RAN device 108).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
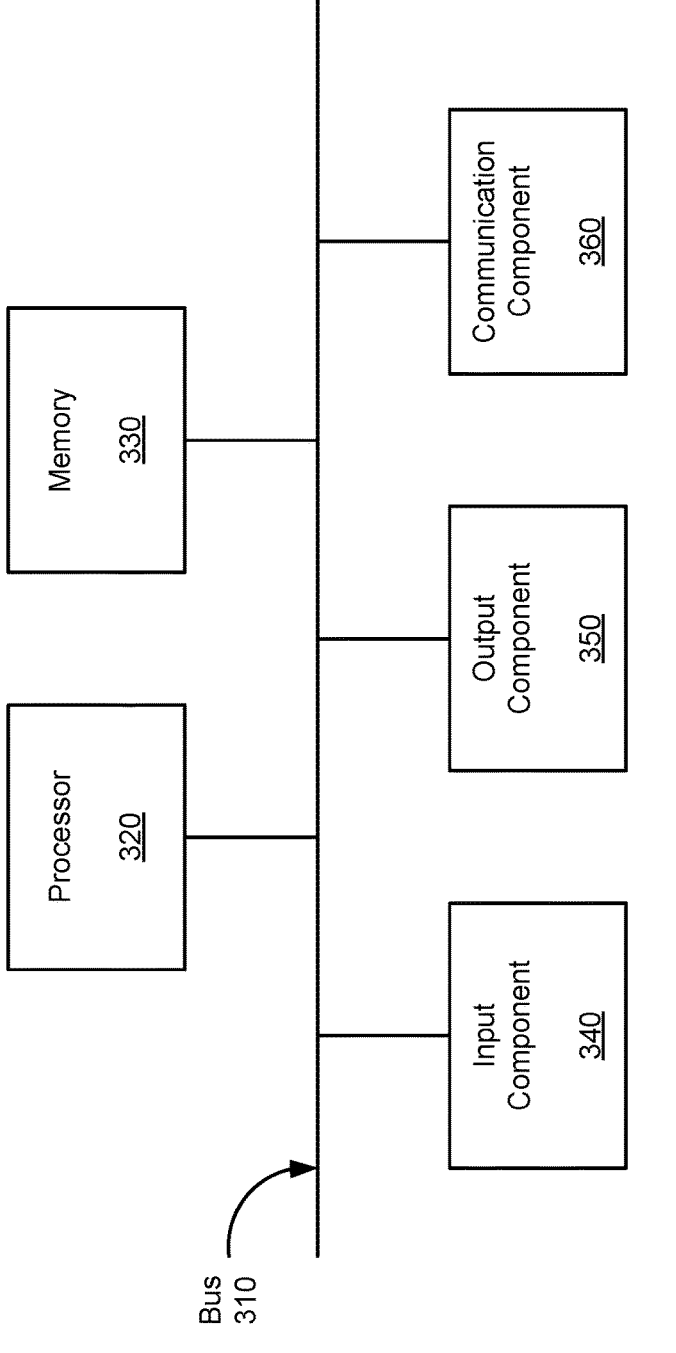
FIG. 3 is a diagram of example components of a device associated with testing RAN components using field RF input.

FIG. 3 is a diagram of example components of a device 300 associated with testing RAN components using field RF input. The device 300 may correspond to the network simulator module 102, the RF emulator device 104, the UE 106, the RAN device 108, and/or another device associated with the network simulation system 101 (e.g., one or more devices described above in connection with FIGS. 1B-1D). In some implementations, the network simulator module 102, the RF emulator device 104, the UE 106, the RAN device 108, and/or another device associated with the network simulation system 101 (e.g., one or more devices described above in connection with FIGS. 1B-1D) may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with testing RAN components using field RF input. In some implementations, one or more process blocks of FIG. 4 may be performed by a network simulator module (e.g., network simulator module 102). In some implementations, one or more process blocks of FIG. 4 may be performed by another device or a group of devices separate from or including the network simulator module, such as an RF emulator device (e.g., RF emulator device 104), and/or a network simulation system (e.g., network simulation system 101) and/or a component thereof. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving real-time radio frequency (RF) channel data (block 410). For example, the network simulator module may receive a real-time RF channel data, as described above. In some implementations, the network simulator module is associated with at least one of a RAN device (e.g., RAN device 108) or a UE (e.g., UE 106). In some implementations, the real-time RF data is associated with emulated real-time channel conditions corresponding to a simulated location of the at least one of the RAN device or the UE. For example, the real-time RF data may be associated with an RF inter-ference corresponding to the simulated location of the at least one of the RAN device or the UE, fast fading effects corresponding to the simulated location of the at least one of the RAN device or the UE, and/or UE traffic corresponding to the simulated location of the at least one of the RAN device or the UE. In some implementations, such as imple-mentations in which the network simulator module is asso-ciated with the UE, the real-time RF channel data may be associated with a simulated movement of the UE.

In some implementations, the at least one of the RAN device or the UE is a physical device that is located at, or that is in communication with, the network simulator module. For example, in implementations in which the network simulator module is associated with the RAN device, the RAN device may be associated with one of a physical DU and a physical RU, or a physical DU and an emulated RU.

As further shown in FIG. 4, process 400 may include receiving measurement data associated with signal measure-ments associated with the at least one of the RAN device or the UE based on the real-time RF data (block 420). For example, the network simulator module may receive mea-surement data associated with signal measurements associ-ated with the at least one of the RAN device or the UE based on the real-time RF data, as described above.

As further shown in FIG. 4, process 400 may include determining a performance of the at least one of the RAN device or the UE based on the measurement data (block 430). For example, the network simulator module may determine a performance of the at least one of the RAN device or the UE based on the measurement data, as described above. In some implementations, process 400 includes receiving, by the network simulator module, updated real-time RF channel signal, receiving, by the network simulator module, updated measurement data asso-ciated with updated signal measurements associated with the at least one of the RAN device or the UE based on the updated real-time RF channel signal, and determining, by the network simulator module, an updated performance of the at least one of the RAN device or the UE based on the updated measurement data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of another example process 500 associated with testing RAN components using field RF input. In some implementations, one or more process blocks of FIG. 5 may be performed by a network simulator module (e.g., network simulator module 102). In some implemen-tations, one or more process blocks of FIG. 5 may be performed by another device or a group of devices separate from or including the network simulator module, such as an RF emulator device (e.g., RF emulator device 104), and/or a network simulation system (e.g., network simulation sys-tem 101) and/or a component thereof. Additionally, or alternatively, one or more process blocks of FIG. 5 may be performed by one or more components of device 300, such as processor 320, memory 330, input component 340, output component 350, and/or communication component 360.

As shown in FIG. 5, process 500 may include creating a simulation scenario in a simulation environment (block 510). For example, a simulation scenario in a simulation environment may be created using the RF emulator device and/or the network simulator module, as described above.

As further shown in FIG. 5, process 500 may include connecting one or more hardware devices to the simulation environment (block 520). For example, one or more hard-ware devices may be connected to the simulation environ-ment via the network simulation module, as described above. In some implementations, the one or more hardware devices may be associated with at least one of a RAN device (e.g., RAN device 108) or a UE (e.g., UE 106). In imple-mentations in which the one or more hardware devices includes a RAN device, the RAN device may be associated with one of a physical DU and a physical RU, or a physical DU and an emulated RU.

As further shown in FIG. 5, process 500 may include executing the simulation scenario to generate traffic for the one or more hardware devices (e.g., one or more UEs) under test (block 530). For example, the RF emulator device and/or the network simulator module may execute the simulation scenario to generate traffic for the one or more hardware devices (e.g., one or more UEs) under test, as described above.

As further shown in FIG. 5, process 500 may include generating, using the simulation environment, real time RF channel data and/or parameters to apply to the one or more hardware devices (block 540). For example, the RF emulator device and/or the network simulator module may generate, using the simulation environment, real time RF channel data and/or parameters to apply to the one or more hardware devices, as described above. In some implementations, the real time RF channel data and/or parameters may correspond to a simulated location of at least one of a RAN device or a UE. For example, the real time RF channel data and/or parameters may be associated with an RF interference corresponding to the simulated location of the at least one of the RAN device or the UE, fast fading effects corresponding to the simulated location of the at least one of the RAN device or the UE, and/or UE traffic corresponding to the simulated location of the at least one of the RAN device or the UE. In some implementations, such as implementations in which the RF emulator device and/or the network simu-lator module is associated with the UE, the real time RF channel data and/or parameters may be associated with a simulated movement of the UE.

As further shown in FIG. 5, process 500 may include gathering, from a physical instrumentation connected to the one or more hardware devices, data in real time, and/or feeding the data back to the simulation environment (block 550). For example, the network simulator module may gather, from a physical instrumentation connected to the one or more hardware devices, data in real time, and/or may feed the data back to the simulation environment (e.g., the RF emulator device), as described above.

As further shown in FIG. 5, process 500 may include determining a performance of the one or more hardware devices based on the data (block 560). For example, the network simulator module may determine a performance of the one or more hardware devices based on the data, as described above. In some implementations, process 500 includes receiving, by the network simulator module, updated real-time RF channel data and/or parameters, gath-ering, by the network simulator module, updated data in real time based on the updated real-time RF channel data and/or parameters, and determining, by the network simulator module, an updated performance of the one or more hardware devices based on the updated data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a network simulator module, real-time radio frequency (RF) data, wherein the network simulator module is associated with at least one of a radio access network (RAN) device or a user equipment (UE), wherein the real-time RF data is associated with emulated real-time channel conditions corresponding to a simulated location of the at least one of the RAN device or the UE, and wherein the at least one of the RAN device or the UE is a physical device that is located at, or that is in communication with, the network simulator module;

receiving, by the network simulator module, measurement data associated with signal measurements associated with the at least one of the RAN device or the UE based on the real-time RF data;

determining, by the network simulator module, a performance of the at least one of the RAN device or the UE based on the measurement data; and determining, by the network simulator module, an updated performance of the at least one of the RAN device or the UE based on updated measurement data associated with updated signal measurements.

2. The method of claim 1, further comprising:

receiving, by the network simulator module, updated real-time RF data; and receiving, by the network simulator module, the updated measurement data associated with the updated signal measurements associated with the at least one of the RAN device or the UE based on the updated real-time RF data.

3. The method of claim 1, wherein the real-time RF data is associated with an RF interference corresponding to the simulated location of the at least one of the RAN device or the UE.

4. The method of claim 1, wherein the real-time RF data is associated with fast fading effects corresponding to the simulated location of the at least one of the RAN device or the UE.

5. The method of claim 1, wherein the real-time RF data is associated with UE traffic corresponding to the simulated location of the at least one of the RAN device or the UE.

6. The method of claim 1, wherein the network simulator module is associated with the RAN device, and wherein the RAN device is associated with one of:

a physical distributed unit (DU) and a physical radio unit (RU), or a physical DU and an emulated RU.

7. The method of claim 1, wherein the network simulator module is associated with the UE, and wherein the real-time RF data is associated with a simulated movement of the UE.

8. A network simulator device, comprising:

one or more processors configured to:

receive, from an emulator device, a first set of real-time radio frequency (RF) data, wherein the network simulator device is associated with at least one of a radio access network (RAN) device or a user equipment (UE), wherein the first set of real-time RF data is associated with emulated real-time channel conditions corresponding to a simulated location of the at least one of the RAN device or the UE at a first period of time, and wherein the at least one of the RAN device or the UE is a physical device that is located at, or that is in communication with, the network simulator device;

determine a first set of performance data associated with a performance of the at least one of the RAN device or the UE based on the first set of real-time RF data;

receive, from the emulator device, a second set of real-time RF data, wherein the second set of real-time RF data is associated with emulated real-time channel conditions corresponding to the simulated location of the at least one of the RAN device or the UE at a second period of time;

determine a second set of performance data associated with a performance of the at least one of the RAN device or the UE based on the second set of real-time RF data; and determine a change in performance of the at least one of the RAN device or the UE based on the first set of performance data and the second set of performance data.

9. The network simulator device of claim 8, wherein the first set of real-time RF data and the second set of real-time RF data are associated with an RF interference corresponding to the simulated location of the at least one of the RAN device or the UE.

10. The network simulator device of claim 8, wherein the first set of real-time RF data and the second set of real-time RF data are associated with fast fading effects corresponding to the simulated location of the at least one of the RAN device or the UE.

11. The network simulator device of claim 8, wherein the first set of real-time RF data and the second set of real-time RF data are associated with UE traffic corresponding to the simulated location of the at least one of the RAN device or the UE.

12. The network simulator device of claim 8, wherein the network simulator device is associated with the RAN device, and wherein the RAN device is associated with one of:

a physical distributed unit (DU) and a physical radio unit (RU), or a physical DU and an emulated RU.

13. The network simulator device of claim 8, wherein the network simulator device is associated with the UE, and wherein the first set of real-time RF data and the second set of real-time RF data are associated with a simulated movement of the UE.

14. A network simulation system, comprising:

a network emulator device;

at least one of a radio access network (RAN) device or a user equipment (UE), the at least one of the RAN device or the UE being a physical device; and a network simulator device in communication with the network emulator device and operatively coupled to the at least one of the RAN device or the UE, wherein the network simulator device is configured to:

receive, from the network emulator device, real-time radio frequency (RF) data, wherein the real-time RF data is associated with emulated real-time channel conditions corresponding to a simulated location of the at least one of the RAN device or the UE, receive, from the at least one of the RAN device or the UE, measurement data associated with signal measurements associated with the at least one of the RAN device or the UE based on the real-time RF data;

determine a performance of the at least one of the RAN device or the UE based on the measurement data; and determine an updated performance of the at least one of the RAN device or the UE based on updated measurement data associated with updated signal measurements.

15. The network simulation system of claim 14, wherein the network simulator device is further configured to:

receive, from the network emulator device, updated real-time RF data; and receive, from the at least one of the RAN device or the UE, the updated measurement data associated with the updated signal measurements associated with the at least one of the RAN device or the UE based on the updated real-time RF data.

16. The network simulation system of claim 14, wherein the real-time RF data is associated with an RF interference corresponding to the simulated location of the at least one of the RAN device or the UE.

17. The network simulation system of claim 14, wherein the real-time RF data is associated with fast fading effects corresponding to the simulated location of the at least one of the RAN device or the UE.

18. The network simulation system of claim 14, wherein the real-time RF data is associated with UE traffic corresponding to the simulated location of the at least one of the RAN device or the UE.

19. The network simulation system of claim 14, wherein the network simulator system comprises the RAN device, and wherein the RAN device is associated with one of:
a physical distributed unit (DU) and a physical radio unit (RU), or
a physical DU and an emulated RU.

20. The network simulation system of claim 14, wherein the network simulator system comprises the UE, and wherein the real-time RF data is associated with a simulated movement of the UE.

* * * * *

22